(12) United States Patent
Widener et al.

(10) Patent No.: US 11,506,326 B2
(45) Date of Patent: Nov. 22, 2022

(54) REPAIR OF ACTIVE LEAKS IN INDUSTRIAL SYSTEMS USING COLD SPRAY

(71) Applicant: South Dakota Board of Regents, Pierre, SD (US)

(72) Inventors: Christian Widener, Rapid City, SD (US); Bharath Jasthi, Rapid City, SD (US); Dimeji Oladepo, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 0 days.

(21) Appl. No.: 17/251,638

(22) PCT Filed: Jun. 13, 2018

(86) PCT No.: PCT/US2018/037214
§ 371 (c)(1),
(2) Date: Dec. 11, 2020

(87) PCT Pub. No.: WO2019/240782
PCT Pub. Date: Dec. 19, 2019

(65) Prior Publication Data
US 2021/0199231 A1 Jul. 1, 2021

(51) Int. Cl.
*F16L 55/18* (2006.01)
*C23C 24/04* (2006.01)
(Continued)

(52) U.S. Cl.
CPC ............ *F16L 55/18* (2013.01); *B05B 7/1486* (2013.01); *C23C 24/04* (2013.01); *F16L 55/168* (2013.01)

(58) Field of Classification Search
CPC ...... F16L 55/18; F16L 55/168; B05B 7/1486; C23C 4/04
See application file for complete search history.

(56) References Cited

U.S. PATENT DOCUMENTS 6,491,208 B2 * 12/2002 James .................. F01D 5/20
228/119
7,367,122 B2 * 5/2008 Yip ...................... F01D 11/02
29/458

(Continued)

OTHER PUBLICATIONS

International Preliminary Report On Patentability, PCT/US18/37214, dated Jul. 27, 2020, 6 pages.
(Continued)

*Primary Examiner* — Kevin R Barss
(74) *Attorney, Agent, or Firm* — Goodhue, Coleman & Owens, P.C.

(57) ABSTRACT

A method of repairing an active leak in embodiments of the present invention may include one or more of the following steps: (a) identifying the active leak on a pipe structure, tank or pressure vessel, (b) setting cold spray system settings to repair the pipe structure, (c) administering pressurized gas and metal powder to an active pipe leak, (d) identifying any potential hazards surrounding the active pipe leak, (e) eliminating and/or reducing the potential hazards surround the active pipe leak, (f) inserting a wedge within an active leak pipe hole, (g) ceasing administration of pressurized gas and metal powder to the active pipe leak when it appears sealed, (h) verifying the active pipe leak is sealed, and (i) re-administering the pressurized gas and the metal powder to the active leak is the active leak is not fully sealed.

19 Claims, 16 Drawing Sheets

(51) Int. Cl.
  *F16L 55/168*    (2006.01)
  *B05B 7/14*      (2006.01)

(56) References Cited

U.S. PATENT DOCUMENTS

| | | | | |
|---|---|---|---|---|
| 7,802,350 | B2 * | 9/2010 | Walker | B23P 6/005 |
| | | | | 29/402.13 |
| 7,958,610 | B2 * | 6/2011 | Benz | B23P 6/00 |
| | | | | 29/402.04 |
| 8,486,249 | B2 * | 7/2013 | Almond | C23C 28/345 |
| | | | | 427/192 |
| 2006/0045785 | A1 * | 3/2006 | Hu | C23C 24/04 |
| | | | | 29/889.1 |
| 2006/0134320 | A1 * | 6/2006 | DeBiccari | C23C 24/04 |
| | | | | 427/140 |
| 2009/0130327 | A1 * | 5/2009 | Erdmanm | C23C 24/04 |
| | | | | 427/457 |
| 2009/0249603 | A1 * | 10/2009 | Vargas | B23P 6/007 |
| | | | | 60/323 |
| 2010/0251962 | A1 * | 10/2010 | Fukanuma | B05B 7/1404 |
| | | | | 118/302 |
| 2014/0115854 | A1 | 5/2014 | Widener et al. | |
| 2014/0117109 | A1 | 5/2014 | Widener et al. | |
| 2018/0154382 | A1 | 6/2018 | Hirano et al. | |

OTHER PUBLICATIONS

International Search Report, PCT/US18/37214, dated Sep. 10, 2018, 17 pages, 3 new references.

* cited by examiner

REPAIR OF ACTIVE LEAKS IN INDUSTRIAL SYSTEMS USING COLD SPRAY

CROSS-REFERENCE TO RELATED APPLICATIONS

This application is a 371 of International Application No PCT/US18/37214, filed Jun. 13, 2018, which is incorporated by reference in its entirety.

FIELD OF THE INVENTION

The present invention relates to the concepts of cold spraying. Particularly, the present invention related to a device, system and method for repairing active leaks. More particularly, but not exclusively, the present invention relates to repairing active leaks utilizing cold spray technology.

BACKGROUND

Wear and degradation of components and parts over time in machines, devices and systems is a problem. The costs associated with repair and reclamation is a major factor driving research to identify cheaper solutions. Another significant consideration is the cost of replacement versus the costs of repair and reclamation. These considerations and factors can be disabling in the case where such components or parts must be removed from operation for repair and reclamation.

Therefore, it is an object, feature or advantage of the present invention to provide a repair and reclamation solution capable of returning a component or part to its full form, fit and function without having to remove the part or component from operation.

Most components and parts used in machines, devices and systems are required to meet certain design, operation and performance specifications. Oversight entities often approve or disapprove of various types of repairs and reclamation attempts for these various components and parts.

Therefore, it is another object, feature or advantage of the present invention to provide cold spray methods making parts and components whole again where the resultant fix returns the part to its full form, fit and function (akin to an OEM part) meeting all the design, performance and operational requirements of any overseeing entity.

Aircraft hydraulic lines tend to wear over time at contact points. This is especially true at locations along the hydraulic lines where the lines are secured by clamps or rub against other components or structures. At these points or location, the normal vibration of the aircraft causes chaffing of the hydraulic line (as the hydraulic line vibrates against an object).

Current solutions to this problem include the (low-tech) approach of simply wrapping the lines with a "chafe wrap". Other solutions include using a sleeve placed around the line over the area of concern. Unfortunately, these sorts of wrapping and sleeving treatments do not stand up over time since the wrap and sleeve themselves wear down over time. In addition, the wrapping and sleeving approaches do not maintain a good surface bond between the hydraulic tubing and the chaff prevention material (i.e. the wrap or sleeve). Therefore, the chaffing prevention material applied eventually only chaffs the tubing material even more. Also, these types of repair and reclamation techniques are not effective for use at the end of a hydraulic tubing. The sleeving repair and reclamation technique requires the tubing be removed from operation thus resulting in down time in the aircraft. Taken together, these impediments represent a huge disadvantage, cost and hurdle to overcome.

Therefore, it is an object, feature, or advantage of the present invention to provide cold spray methods for repairing and reclaiming aircraft hydraulic lines by repairing the line to its kill form, fit and function (akin to an OEM hydraulic line).

A still further object, feature, or advantage of the present is to provide cold spray methods for repairing and reclaiming hydraulic lines performed in situ while the line is still in operation.

The existing systems for cold spraying metal particles operate by mixing a pressurized gas together with a stream of powdered metallic particles. The resulting gas/metallic particle mixtures are sprayed onto an object, thereby applying the metallic particles to the surface of the object.

In a cold spray process, specially engineered sub-micron and micron sized solid state particles are accelerated to supersonic speeds through a convergent-divergent nozzle using such gases as helium and nitrogen or other like gases or even compressed air. When the particles impact the surface, they form a strong mechanical and metallurgical bond.

Currently, all existing cold spray systems are not utilized on active leaks. These are systems which are still pressurized or have gasses and/or fluids still moving through them. Before the cold spray systems can be used, these active leak systems are shut down, so the cold spray system can be used to repair the active leak system.

It would be desirable to provide a method to repair active leaks, without shutting down equipment and systems on the facility.

It is further desirable to restore pipes and other components to their original dimensions with the different type of materials.

Therefore, it is desirable to repair active leaks in piping and mechanical equipment using Cold spray technology.

SUMMARY

Therefore, it is a primary object, feature, or advantage of the present invention to improve over the state of the art.

A method of repairing an active leak in embodiments of the present invention may include one or more of the following steps: (a) identifying the active leak on a pipe structure, tank or pressure vessel, (b) setting cold spray system settings to repair the pipe structure, (c) administering pressurized gas and metal powder to an active pipe leak, (d) identifying any potential hazards surrounding the active pipe leak, (e) eliminating and/or reducing the potential hazards surround the active pipe leak, (f) inserting a wedge within an active leak pipe hole, (g) ceasing administration of pressurized gas and metal powder to the active pipe leak when it appears sealed, (h) verifying the active pipe leak is sealed, and (i) re-administering the pressurized gas and the metal powder to the active leak is the active leak is not fully sealed.

A cold spray repair for active leaks in a piping structure method in embodiments of the present invention may have one or more of the following steps: (a) taking a gas and a powder, (b) combining the gas and the powder creating a gas-powder mixture, (c) communicating the gas-powder mixture to a spray gun, (d) administering the gas-powder mixture from the spray gun onto a surface of the piping structure in a location of a hole and active leak in the piping structure, (e) repairing the piping structure while the piping structure still has fluids and/or pressurized materials flowing through it, (f) setting a cold spray system setting, (g) verifying the active leak has been sealed, (h) inserting a wedge into the piping structure hole if the piping structure hole is large, (i) identifying potential hazards at the active leak, and (j) eliminating and/or reducing the potential hazards at the active leak.

A method for cold spraying an active leak on a piping structure in embodiments of the present invention may have one or more of the following features: (a) providing one or more of the following features: (i) a cold spray system comprising a dry powder source housing a dry powder, a gas source for a gas and an accelerant, and a mixing manifold, wherein the powder source has a gas source input connected in operable communication with a gas line having a gas line pressure for receiving the gas from the gas source, (ii) a gas-powder line operably connected to the dry powder source for receiving the dry powder, the gas source for receiving the gas and the mixing manifold for receiving a gas-powder mixture, (iii) a gas-powder mixture outlet connected in operable communication with the gas-powder line for receiving a gas-powder mixture from within the dry powder source, wherein the gas source input and the gas-powder mixture outlet operate at the gas line pressure using the gas from the gas source, (iv) an accelerant line carrying the accelerant from the gas source and operably connected to the gas source and the mixing manifold, (v) a cold spray gun assembly consisting of a gas-powder-accelerant mixture hose having a hose length for carrying a gas-powder-accelerant mixture from the mixing manifold a distance from the mixing manifold through the hose length, an input end operably connected to the mixing manifold and an output end operably connected to a cold spray gun, wherein the cold spray gun is positionable away from the mixing manifold and near the active leak by extending the hose length, (b) identifying the active leak on the piping structure; aiming the cold spray gun at a hole on the piping structure being the source of the active leak, (c) depositing cold spray material onto the piping structure at the hole, (d) identifying any potential hazards around the active leak, (e) eliminating and/or reducing the potential hazards around the active leak, (t) ceasing deposition of cold spray material onto the piping structure when the leak appears sealed, and (g) inserting a wedge into the hole if the hole is greater than 0.007 inch in diameter.

One or more of these and/or other objects, features, or advantages of the present invention will become apparent from the specification and claims following. No single embodiment need provide every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

Figure 1:
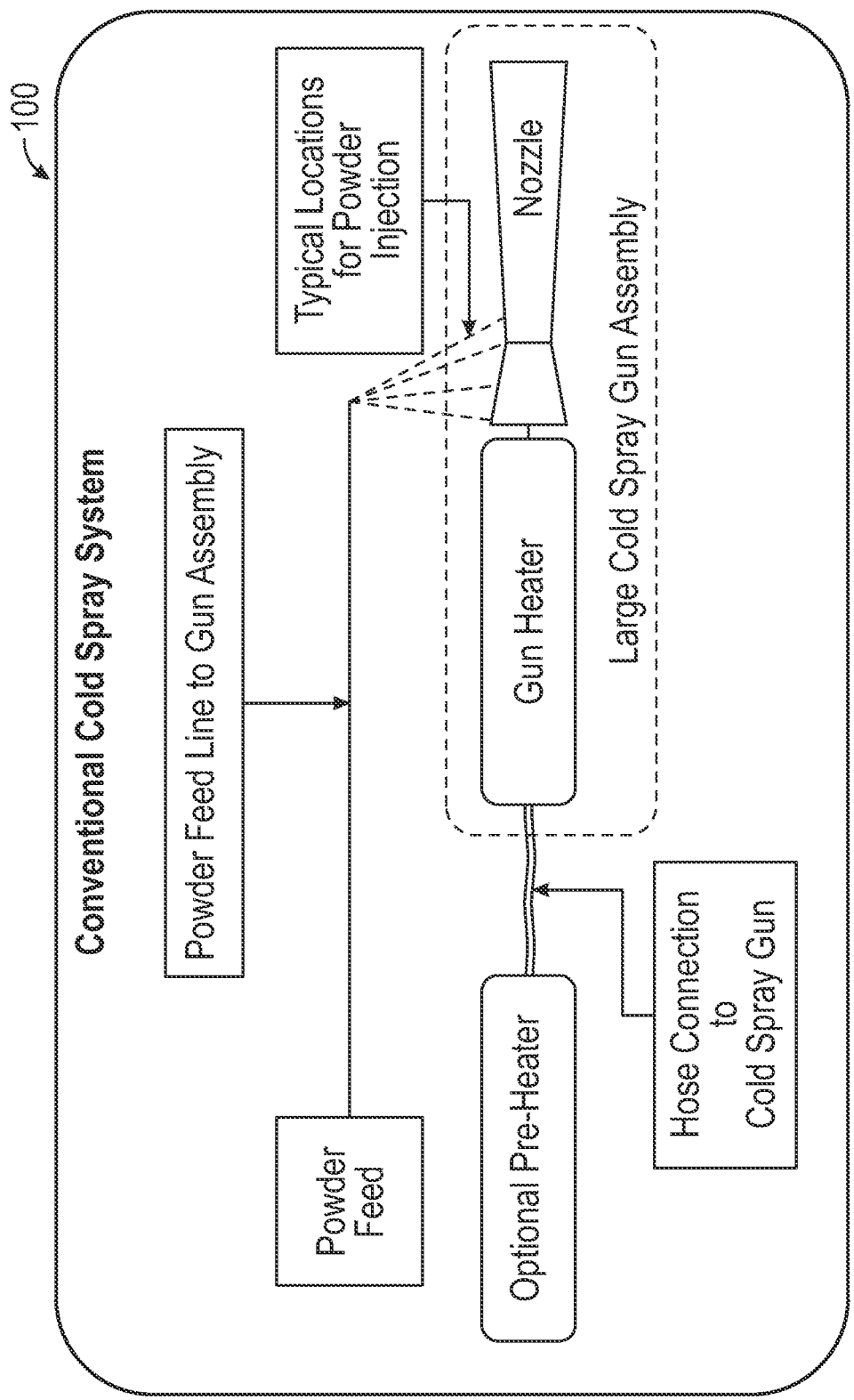
FIG. 1 is a pictorial representation of a conventional cold spray system in an embodiment of the present invention.

Some of the figures include graphical and ornamental elements. It is to be understood the illustrative embodiments contemplate all permutations and combinations of the various graphical elements set forth in the figures thereof.

DETAILED DESCRIPTION

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of repairing active leaks in piping structures, it is fully contemplated embodiments of the present invention could be used in most any cold spray system without departing from the spirit of the invention.

Figure 2:
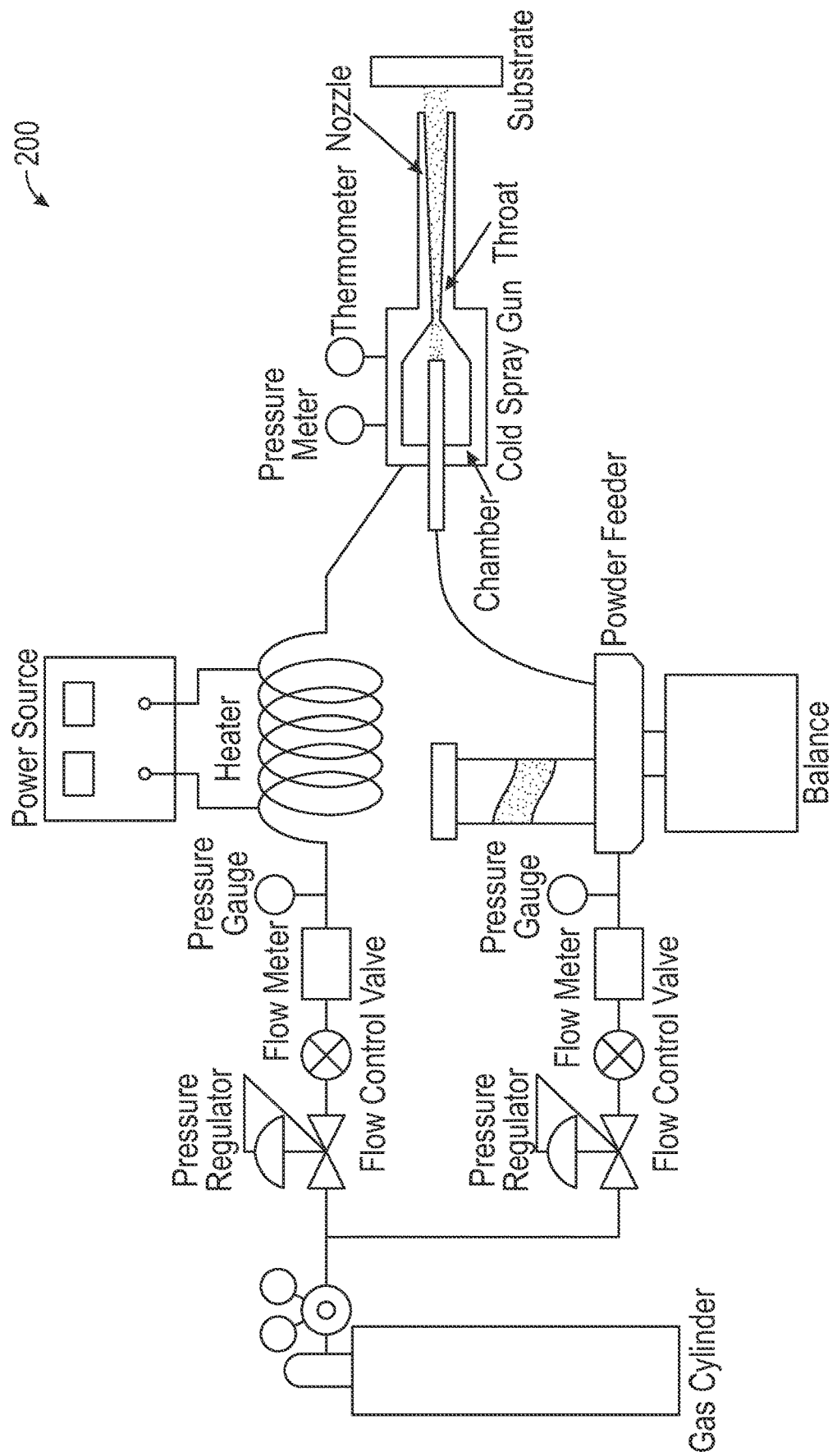
FIG. 2 is a pictorial representation of another convention cold spray system in an embodiment of the present invention.

FIGS. 1-2 illustrate conventional cold spray devices and systems. As can plainly be seen in the conventional cold spray devices and systems, a large spray gun assembly includes both a spray nozzle and a heater (see FIG. 1). Powder is both heated and injected right at the spray nozzle into the nozzle body. The conventional cold spray system 200 pictorially represented in FIG. 2 plainly illustrates the mixing of the gas stream and the powder stream in the cold spray gun.

Figure 3:
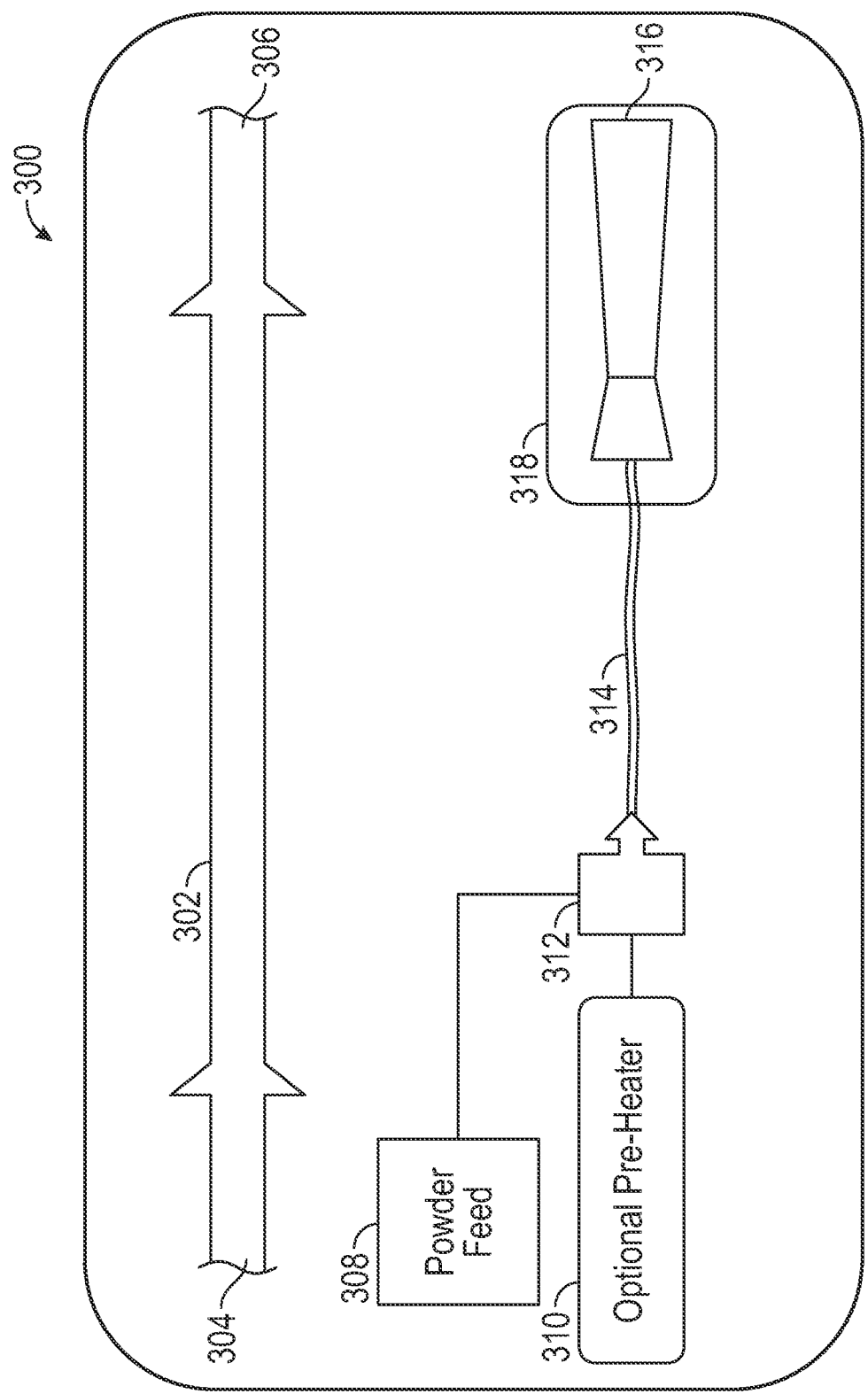
FIG. 3 is a pictorial representation of a cold spray system in accordance with an embodiment of the present invention.

FIG. 3 is a pictorial representation of another embodiment of the invention of conventional cold spray devices and systems. Cold spray system 300 pictorially represented in FIG. 3 is but one embodiment of the present invention. Provided at the top of the illustration is a flow path continuum 302 having an inlet side 304 and an outlet side 306. Arrows along the flow path continuum 302 show the direction of flow through the path. The flow path continuum 302 is indicative of the direction, order and timing of inputs into the flow path 302 starting from the inlet side 304 working toward the outlet side 306. As can be seen, one or more inputs, such as inputs 308 and 310 may be configured as inputs into the flow path continuum 302. For example, one input 308 may be a powder or metal particulate constituent and the other input 310 may be an accelerant or a pressurized gas stream, which optionally may be heated as indicated. These inputs 308, 310 may be collectively received at a confluence point 312 in the flow path continuum 302. The mixture of the two inputs 308, 310 are communicated from the confluence point 312 along the flow path continuum 302 through flow path 314. In the flow path continuum 302 is also included a nozzle body assembly 318 including generally at its terminal end a discharge nozzle 316 for discharging the inputs 308, 310 into the flow path continuum 302 from the outlet side 306. Thus, as illustrated, the inputs 308, 310 (which are not limited to the inputs shown) are combined at the confluence point 312 and moved through the flow path continuum 302 together to the nozzle body assembly 318; the inputs 308, 310 being generally on the inlet side 304 of the flow path continuum 302 and the discharge nozzle 316 being generally at the outlet side 306 of the flow path continuum 302. It is clear from the pictorial representation provided in FIG. 3 the inputs 308, 310 into the flow path continuum 302 are mixed upstream of the nozzle body assembly 318 at some confluence point 312, which is in the flow path continuum 302 upstream of the nozzle body assembly 318. In one embodiment, only a single line, hose, or conduit (preferably flexible) is only required as the flow path 314 for carrying the inputs 308, 310 along the flow path continuum 302 from the confluence point 312 to the nozzle body assembly 318 to be ultimately discharged from the discharge nozzle 316. In a basic embodiment of the invention, inputs 308, 310 comprise a powder and an accelerant. The powders are accelerated through the flow path continuum 302 to a nozzle body assembly 318, but preferably not melted during the acceleration of the particulate matter or powder traveling through the flow path continuum 302.

Figure 4:
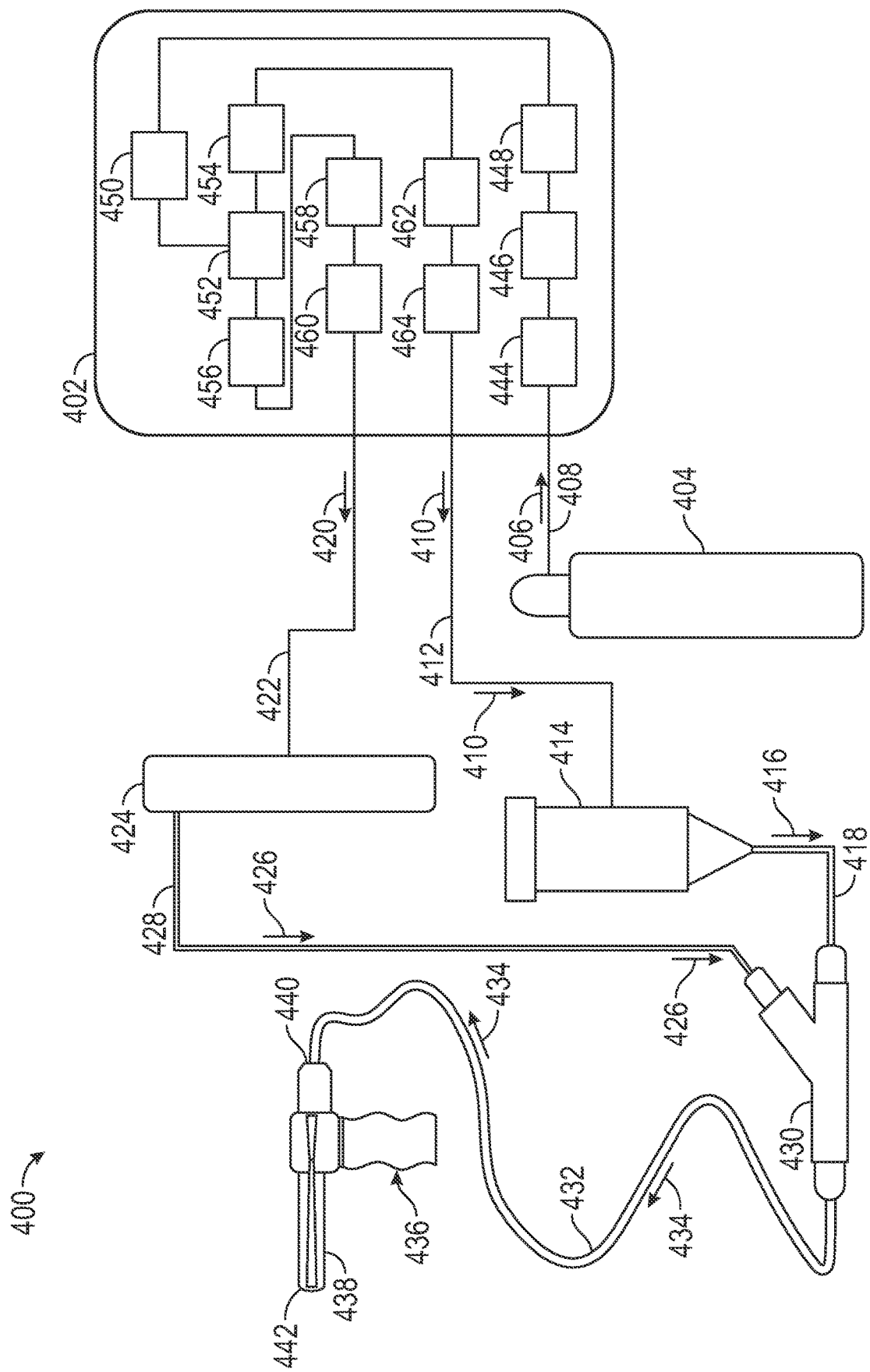
FIG. 4 is a pictorial representation of another cold spray system in accordance with an embodiment of the present invention.

FIG. 4 provides a more detailed pictorial representation of a cold spray system 400. Aspects of the cold spray system 400 include a gas controller 402 connected in communication with a gas source 404 via flow path 408. The direction of flow of the gas from the gas source 404 to the gas controller 402 is indicated by flow arrow 406. The gas controller 402 may include one or more devices, systems or processes for controlling the flow of gas from the gas source 404 as possible inputs into the spray nozzle 436. Exemplary components of the gas controller 402 include a valve 444, such as an emergency shut off solenoid valve connected in communication with a sensor, such as a pressure transducer ("PT") and a regulator 448, such as a manual regulator, Another sensor, such as a pressure transducer ("PT") for detecting pressure providing an electrical, mechanical or pneumatic signal related to the pressure may be included in-line after the regulator 448. A line split 452 may be included after the sensor 450. The line split 452 may be a "T" in the line for distributing a portion of the gas to the regulator 456 or regulator 454, such as an electric pressure regulator. The lines running off each respective regulator 454, 456 may be connected in communication with sensors 458, 462, such as a temperature sensor, and flow meters 460, 464, such as mass flow meters. Thus, a gas source 404 is provided as an input to the gas controller 402 which operably provides two outputs into flow path 412 and flow path 422 flowing in the direction indicated by flow arrow 410 and flow arrow 420 respectively. The gas controller 402 may be used to control the pressure and flow rate of the gas in respective flow paths 412, 422.

The pressure and flow rate of the gas in flow path 412 may be regulated to different pressures and flowrates than the gas in flow path 422. Gas in flow path 422 travels in the direction of flow arrow 420 through a heat source 424 imparting heat to the gas which then flows through flow path 428 into mixing manifold 430 in the direction as indicated by the flow arrows 426. Thus, one of the inputs into the mixing manifold 430 is a heated gas stream having a desired flow rate, pressure and temperature operably provided by the heat source 424 and the gas controller 402. Additionally, gas flows through flow path 412 as indicated by flow arrows 410 into the powder source 414. The gas flowing into the powder source 414 carries with it powder through flow path 418 as indicated by flow arrow 416 into the mixing manifold 430. Thus, a mixture of powder and gas provide another input into the mixing manifold 430, which provides a mixing function of the two inputs provided through flow path 428 and flow path 418. The two inputs, for example, include a heated affluent or accelerant, such as a heated gas stream, and a powder carried by the other gas stream into the mixing manifold 430. The pressure and volume of the flows in the flow paths 428, 418 may be controlled to control the inputs into the mixing manifold 430 and mixing of the inputs. The temperature and pressure of the inputs into the mixing manifold 430 may be used to control the temperature of the discharge (i.e., cold spray) from the spray nozzle assembly 436. In other words, the stagnation pressure of a supersonic nozzle, such as the spray nozzle assembly 436, may be controlled by controlling the pressure and temperature of its inputs, namely the temperature and pressure of an accelerant and powder. The inputs into the mixing manifold 430 are combined and communicated through flow path 432 as indicated by flow arrow 434 to the inlet 440 of the spray nozzle assembly 436. Means for controlling the flow of the mixture through the spray nozzle assembly 436, such as a valve or other open or closeable type opening may be provided in the spray nozzle assembly 436. The mixture travels through the spray nozzle assembly 436, out the nozzle body 438 and discharged through the outlet 442 onto a surface of interest.

Of specific note, as illustrated pictorially in FIG. 4, the powder and gas mixing occurring in the mixing manifold 430 happens upstream of the spray nozzle assembly 436. Also, given the spray nozzle assembly 436 includes a single flow path 432 connected at its inlet 440, the spray nozzle assembly is very compact and highly maneuverable and thus capable of being a "hand-held" spray nozzle assembly 436.

Embodiments of the invention pictorially represented in FIG. 4 may include one or more sensors in the manifold 434 on the spray nozzle assembly 436 for measuring or detecting such parameters as pressure, temperature or the like. Conventional cold spray devices and systems, such as those illustrated in FIGS. 1-2, generally measure temperature right before the powder and gas are mixed but not after. Aspects of the present invention provide for measuring the temperature of the gas-powder mixture exiting the mixing manifold 430 through flow path 432. Furthermore, temperature of the gas-powder mixture may be measured at the spray nozzle assembly 436 using, for example, a k-type thermocouple may be configured to communicate temperature readings either wirelessly or by wired connection to a control system (not shown). Pressure of the gas-powder mixture may also be monitored at the mixing manifold 430 or at the spray nozzle assembly 436 using, for example, a gas turbine pressure sensor. Pressure readings from the pressure sensor may be communicated wirelessly or by wired connection to a control system (not shown).

The gas source 404 may include, for example, nitrogen, helium or compressed air. As previously indicated, gas controller 402 may be used to control the pressure of the gas in flow paths 422 and 412, respectively. In accordance with an embodiment of the invention, the gas controller 402 may be configured to operate the powder source 414 at or around 500 psi, or at least above 300 psi. Similarly, the gas controller 402 may be configured to pass gas through the heat source 424 at or close to 500 psi, and at least above 300 psi. The heat source 424 may be configured to operate in a temperature range generally from 600-900° C., or thereabout.

Preferably, the heat source 424 is configured to operate at a temperature below the melting temperature of the powder. Therefore, the temperature of the gas-powder mixture being discharged from outlet 442 may be controlled by controlling the temperature of the heat source 424 and the pressure of the gas passing through heat source 424 and powder source 414. The temperature of the gas-powder mixture being discharged out the outlet 442 of the spray nozzle assembly 436 may be increased (using gas controller 402) by increasing the temperature of the heat source 424 and/or increasing the pressure of the gas. For example, for lower powder melting temperatures, the temperature of the heat source 424 can be turned down while the pressure of the gas can be increased using the gas controller 402 to compensate for a non-increase in the temperature of the gas or a lower heat source 424 operating temperature. Optionally, an additional heat source may be included in flow path 412 for heating or preheating the gas passing through powder source 414, whereby both gas streams in flow paths 418 and 428 are heated streams, with the gas stream in flow path 418 carrying suspended powder or particulate matter. In a preferred aspect of the invention, the temperature of the gas-powder mixture is to range between 600-900° C.

Using a non-heated gas stream for feeding powder from powder source 414 into flow path 418 may result in a temperature loss in the heated gas stream entering the mixing manifold 430 through flow path 428 in an order generally between 150-200° C. This temperature loss can be overcome by, for example, heating or preheating the gas passing through flow path 412 into the powder source 414. Optionally, the powder or particulate matter suspended in the gas may be heated in flow path 418. Cold spraying high temperature materials (e.g., nickel, titanium, aluminum) may necessitate the discharge temperature of the gas-powder mixture from the outlet 442 of the spray nozzle assembly 436 to be higher than a resulting discharge temperature minus the temperature loss from an unheated gas stream being used to provide powder from the powder source 414. Thus, depending upon the type of material being cold sprayed, the system 400 may include a heater or heat source for upstream heating of the gas used to move the powder from the powder source 414 into the mixing manifold 430. Alternatively, or in combination, the pressure of the gas in either flow path 422 or 412 may be increased to increase the temperature of the gas-powder discharge from the outlet 442 of the spray nozzle assembly 436 using means to control the stagnation pressure and temperature of the supersonic nozzle included in the spray nozzle assembly 436. Although a single gas source 404 is illustrated, embodiments of the invention contemplate using multiple gas sources for feeding flow paths 422 and 412 with the same type of gas or different types of gas.

According to a preferred aspect of the invention, powder or particulate matter communicated from powder source 414 to the mixing manifold 430 combines with heated gas from the heat source 424, The two form a gas-powder mixture which travels together through the flow path 432 to the spray nozzle assembly 436. In one embodiment (where the gas introduced into the powder source 414 is not heated) the temperature of the powder passing through flow path 418 and into mixing manifold 430 is less than the temperature of the gas (entering the mixing manifold 430) from heat source 424 through flow path 428. Thus, heat is transferred from the heated gas to the powder as it travels through flow path 432 to the spray nozzle assembly 436.

Figure 9:
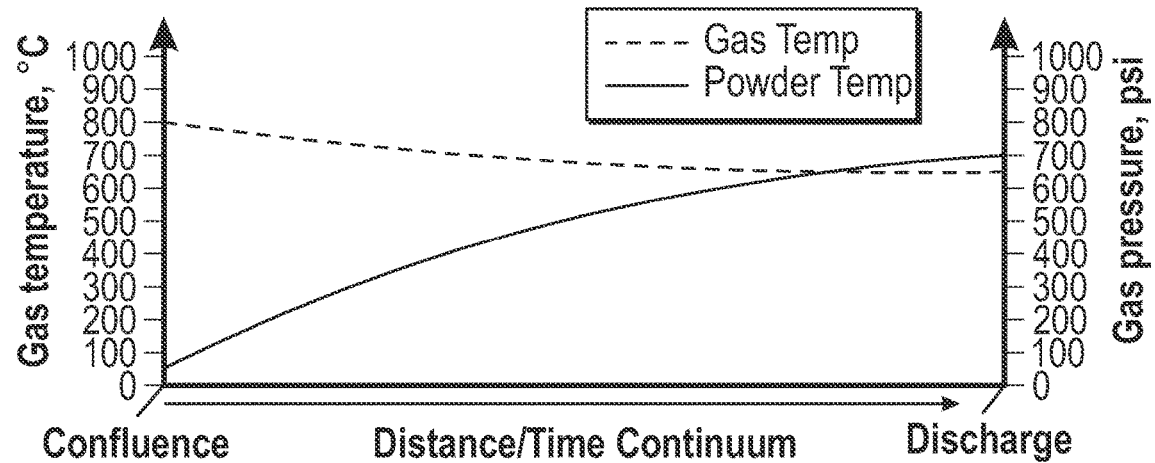
FIG. 9 is a plot of gas temperature and powder temperature over a distance/time continuum in accordance with an embodiment of the present invention.

FIG. 9 provides a pictorial representation of a plot exhibiting a distance or time continuum from confluence (i.e., mixing manifold 430) to discharge (i.e., outlet 442). As illustrated, the temperature of the gas enters the mixing manifold 430 generally at the set temperature of the heat source 424. In this case, simply for purposes of illustrating, the gas enters the mixing manifold or the confluence at a temperature of roughly 800° C. whereas the powder is generally around room temperature or 20° C. Over the distance/time continuum from the mixing manifold 430 to discharge 442, the powder absorbs heat from the heated gas, raising the temperature of the powder to a desired gas-powder discharge temperature. By way of illustration, FIG. 9 shows the powder temperature at discharge and the gas temperature at discharge being generally equal and preferably in the range of 600-900° C. Over the distance/time continuum from confluence or mixing manifold 430 to discharge 442 the particulate matter or powder softens as the temperature of the powder increases, making the powder more deformable and capable of achieving high bonding strengths. Note, this is contrary to conventional powder spray systems illustrated, for example, in FIGS. 1-2, where the powder is introduced just a very short distance from the substrate, to the effect there is virtually no time to heat and soften the powder before discharge using the heated gas stream. By understanding the heat loss and heat transfer properties between the gas and powder, the temperature inputs for the gas and the pressure input for the gas can be controlled so the temperature of the gas-powder mixture at the outlet 442 of the spray nozzle assembly 436 is operating at a desired range. Further embodiments include configuring the mixing manifold 430 and/or the spray nozzle assembly 436 with pressure and temperature sensors, such as those previously indicated, for determining, for example, the temperature of the gas-powder mixture being discharged from outlet 442 of the spray nozzle assembly 436. It is important these operating parameters are controlled as they can cause a significant increase or decrease in the ultimate compression strength of the cold spray. A well dialed in system where the temperature and pressure of the discharge is controlled, can reach 30-40 ksi compression strength readings for the cold spray applied to the surface of a substrate or working piece. Ideally, controlling the operating parameters of system 400 allows the cold weld strength to approach the strength to the piece to which it is applied. Being able to control the pressure and temperature, measure the pressure and temperature, and know the pressure and temperature of the discharge from outlet 442 of the spray nozzle assembly 436 is key in meeting the objective parameters for a cold spray system 400 in accordance with objectives of the present invention.

Figure 5A:
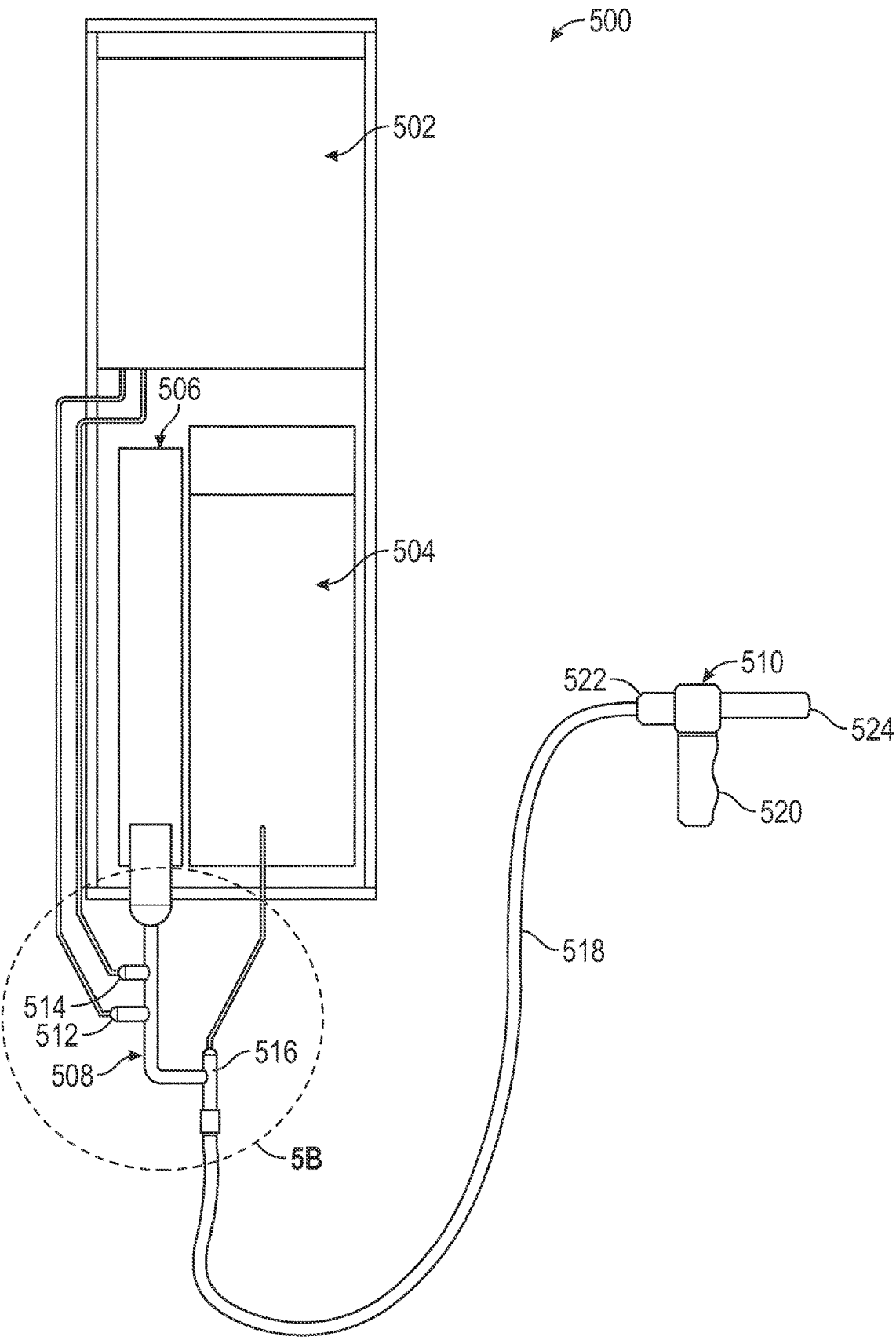
FIG. 5A is a pictorial representation of a cold spray system in accordance with an illustrative embodiment.

FIG. 5A provides a pictorial representation of a cold spray system according to an embodiment of the present invention. The system 500 illustrated in FIG. 5A may leverage, use or adopt one or more of the concepts described herein. The cold spray system 500 may be configured as a compacted, and thereby easily portable, system where its various components can be positioned in relative proximity to each other. For example, cold spray system 500 may include a control system 502, powder system 504, heating system 506, flow path system 508, and discharge system 510. These systems may be configured to operate in concert with one another to provide a gas-powder mixture at the outlet 524 of the discharge system 510. The control system 502 is operably configured to control one or more of the systems illustrated. Powder system 504 provides powder to the mixing manifold 516. Heating system 506 provides heated gas to the mixing manifold 516. The flow path system 508 may be configured to communicate powder from the powder system 504 and heated gas from the heating system 506 to the mixing manifold 516. One or more sensors such as sensor 512, 514 may be configured in flow path system 508 for detecting, for example, pressure and/or temperature of the inputs into the mixing manifold 516. According to an embodiment of the invention, a pressure sensor and temperature sensor may be positioned in the flow path system 508 to monitor pressure and temperature of the gas from heating system 506 passed into mixing manifold 516. Optionally, sensors 512, 514 may be configured at any location along the flow path system 508. The control system 502 may monitor inputs and responses to the detected pressures and temperatures. Sensors 512 and 514 may be configured at the discharge system 510, such as for example, on the nozzle body 520 for measuring a pressure and/or temperature of the gas-powder mixture or the separate constituents prior to or after being discharged from the outlet 524 of the discharge system 510. A line 518 connects the discharge system 510 to the mixing manifold 516. The gas-powder mixture travels from the mixing manifold 516 to the discharge system 510 through line 518. The gas-powder mixture is received into the nozzle body 520 through inlet 522 and discharged through outlet 524.

Figure 5B:
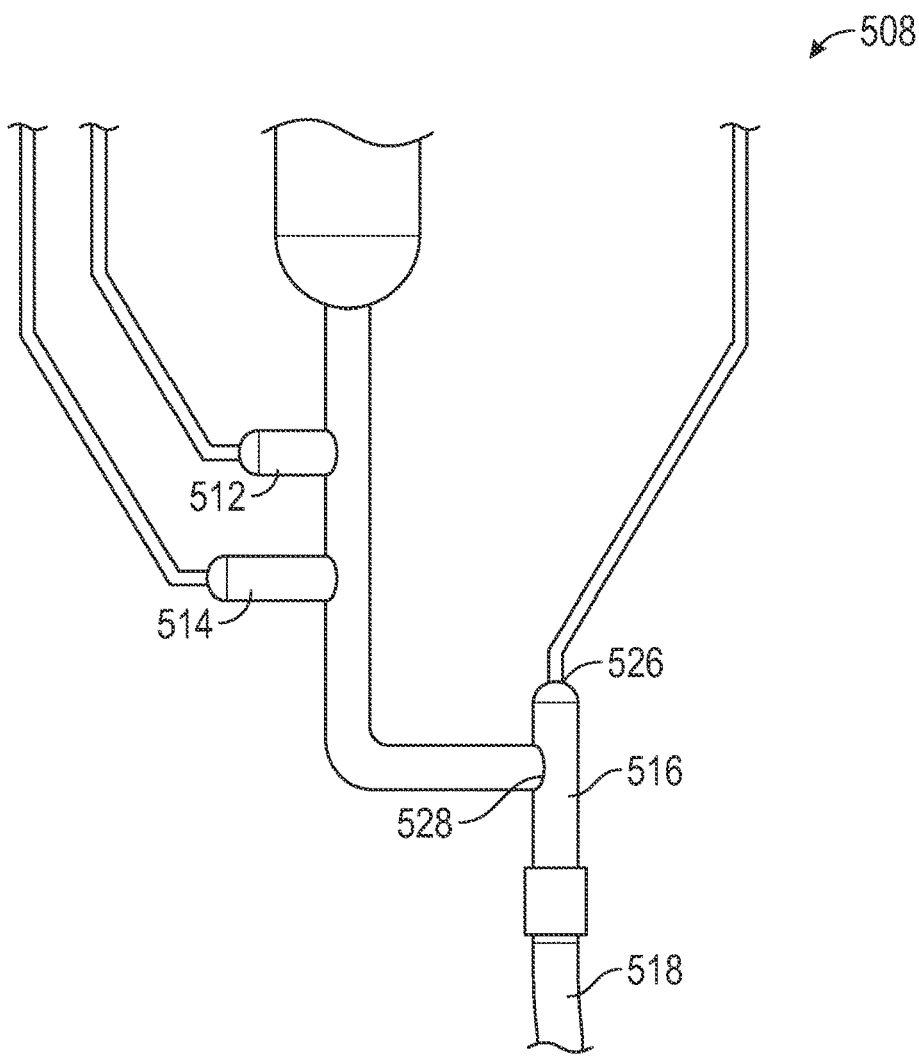
FIG. 5B is a pictorial representation taken along line 5B-5B in FIG. 5A in an embodiment of the present invention.

FIG. 5B provides a detailed view taken along line 5B-5B in FIG. 5A, FIG. 5B provides a pictorial representation of the closeness and proximity of the mixing manifold 516 to the powder system 504 and/or heating system 506. Thus, the discharge system 510 becomes a highly maneuverable, very compact and easily positionable member of the cold spray system 500. As with other embodiments, the mixing manifold 516 is configured upstream of the nozzle body 520. The flow path system 508 represented pictorially in FIG. 5B is but one exemplary representation of the confluence of powder from the powder system 504 and heated gas from the heating system 506 which are introduced into the mixing manifold 516 at inlets 528 and 526, respectively. The two inputs into the mixing manifold 516 are combined and discharged into the line 518 as a gas-powder mixture.

Figure 6:
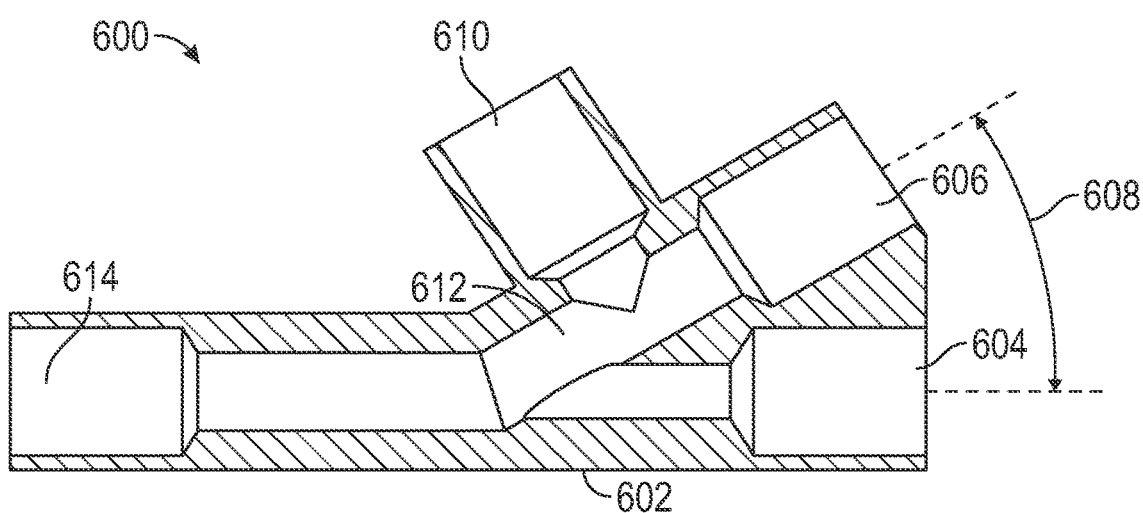
FIG. 6 is a pictorial representation of a mixing manifold in accordance with an embodiment of the present invention.

FIG. 6 provides a pictorial representation of a mixing manifold in accordance with an exemplary aspect of the invention. The mixing manifold 600 includes body 602 housing inlets 604 and 606 adapted to receive inputs into the mixing manifold 600. A port 610 is also included in the body 602 of the mixing manifold 600. The angle 608 between the inlets 604, 606 may be controlled to adjust the mixing of the gas-powder mixture within the mixing manifold 600. Port 610 may be used to house a sensor, gauge or other observational probe for monitoring, for example, the temperature, pressure or other parameters of the inputs into the mixing manifold 600. According to an embodiment of the invention, port 610 may be used to monitor the temperature of the gas received through one of the inlets 604 or 606 into the mixing manifold 600. The inlets into the mixing manifold 600 combine in flow path 612 and pass from the mixing manifold through outlet 614. A mixing manifold 600 such as the one pictorially represented in FIG. 6 may be used in any one of the systems of the present invention. According to one exemplary aspect, the mixing manifold 600 includes an inlet 604 which is in line with the outlet 614. The inlet 604 has a smaller inner diameter to allow for powder to be input into the center of the flow using the smaller diameter of the inlet 604. Note the diameter of the tube space between flow path 612 and inlet 604 is smaller in diameter than the diameter of the flow path 612. The flow path 612 continues for a difference after the junction where flow path 612 and inlet 604 juncture. This provides more stable gas flow development in the mixing manifold, particularly at the junction and downstream. The angle 608 of inlet 606 relative to inlet 604 aids in the promotion of achieving a stable flow pattern more quickly. The powder entering through inlet 604 and heated gas entering through inlet 606 can be mixed without the angle or the smaller diameter tube previously discussed, however, clogging of the mixing manifold 600 is addressed by creating stable flow accelerations of the powder into and through the walls of the flow path 612. As previously indicated, the port 610 in communication with inlet 606 allows for process measurements such as pressure and temperature.

Figure 7:
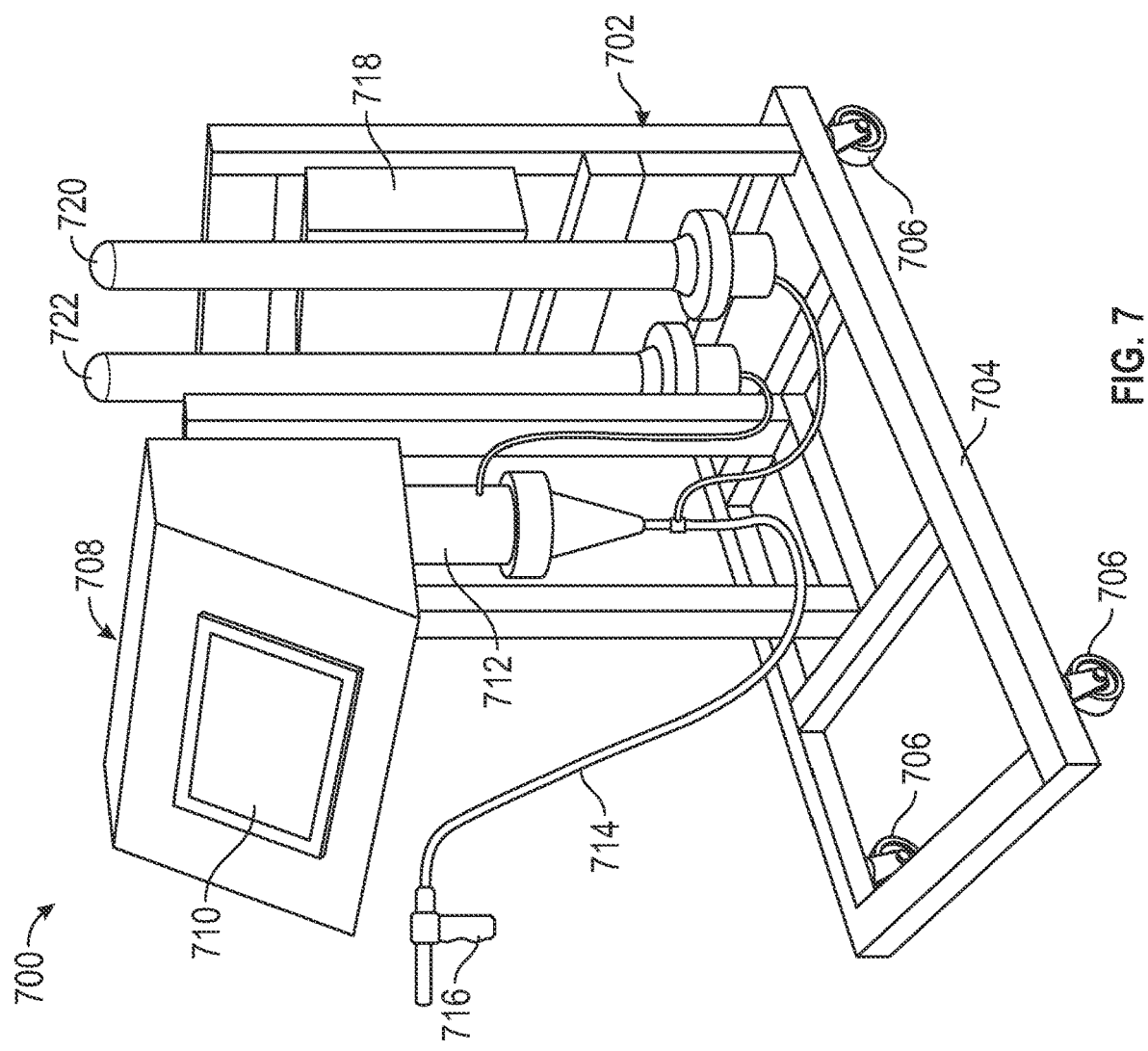
FIG. 7 is a pictorial representation of a mobile cold spray system in accordance with an embodiment of the present invention.

FIG. 7 provides pictorial representation of a mobile cold spray system 700 in accordance with a representative embodiment of the invention. Mobile cold spray system 700 is provided to illustrate pictorially how easily the designs of the present invention may be mobilized or configured to be mobile. By way of example, a mobile platform 702 is provided including a structure 704 for supporting one or more of the systems for providing a mobile cold spray system 700. The structure 704 may be set on one or more casters 706 for providing a mobile structure. A control system 708 having a display 710 may be configured on the mobile platform, Additionally, a powder source 712 having a line 714 connected to a spray nozzle 716 may also be mounted on the mobile platform 702.

Gas controllers 718, gas source 720 and heat source 722 may also be operably mounted aboard mobile platform 702. In this manner, any one or more of the embodiments of the invention may be mobilized making the system ideal for transporting to and working in tight spaces where the length of the line 714 may be configured so the spray nozzle 716 may be positioned in places where bulkier and less mobile type cold spray systems would never be capable of being used. Thus, the mobile cold spray system 700 has a high degree of maneuverability and is well suited for working in tight spaces or for accessing any space or position in which the spray nozzle 716 can be maneuvered. Constructed in this way, embodiments of the present invention provide greater access and maneuverability of the spray nozzle 716 and system, which cannot be provided by conventional cold spray devices and systems.

Figure 8:
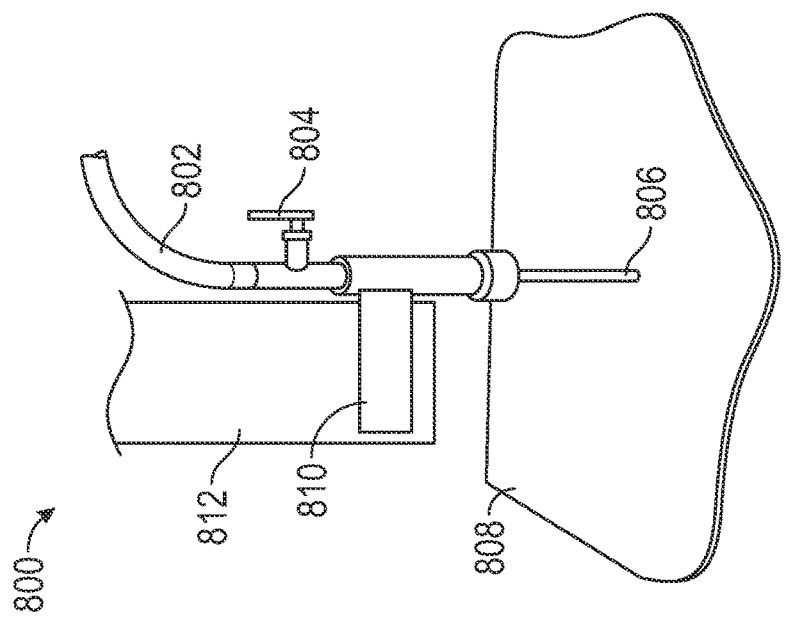
FIG. 8 is a pictorial representation of an automated cold spray system in accordance with an embodiment of the present invention.

FIG. 8 provides a pictorial representation of an automated cold spray system 800. Given the maneuverability of the spray nozzle, embodiments of the present invention contemplate articulation, manipulation, movement, and/or placement of the spray nozzle in any position, orientation, angle or otherwise using automated systems. For example, embodiments of the invention may be configured to be manipulated by a six-axis robotic arm or other robotic systems. Thus, automation means 812 may be used to manipulate the position of the spray nozzle 806 relative to a work surface 808. A valve 804 may be used to operably control or regulate the flow of gas-powder mixture through line 802 through spray nozzle 806 onto the work surface 808. Automation means 812 attached to the spray nozzle 806 by arm 810 may be used to manipulate the position of the spray nozzle 806 relative to the work surface 808. Given the spray nozzle 806 leverages embodiments of the present invention whereby gas-powder mixture are brought to the spray nozzle 806 through a single line 802 the nozzle becomes highly maneuverable, positionable and articulable relative to a working surface 808 whether by hand, by automation or otherwise.

Up until the present invention, cold spray technology has not been utilized to repair active piping systems (e.g., piping systems which are still pressurized and/or have materials within them). The inventors have discovered they can utilize cold spray technology to repair active piping systems, as will be discussed in detail below.

In the past, before using cold spray technology to repair piping systems, the pipeline having the portion of pipe which needed repaired was shut down and then drained. This shutting down of the pipeline causes downtime for the system which can result in lost production and lost revenue. To prevent this downtime, the inventors have developed a process whereby piping systems in need of repair can be done while the system is still active and thus eliminate lost production and lost revenue for a business. To show how this process works an example of an active system piping repair is shown below.

Figure 10:
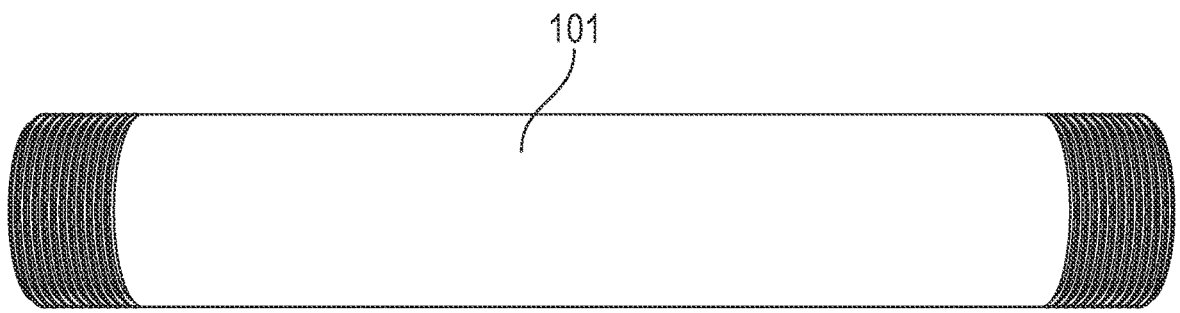
FIG. 10 is a pictorial representation of a piping structure in accordance with an embodiment of the present invention.

With reference to FIG. 10 a pictorial representation of a piping structure in accordance with an embodiment of the present invention is shown. The piping 101 can be 2-inch SCH (schedule) 80 pipe. SCH 80 pipe 101 can be made of steel, aluminum or stainless steel or most any type of metal without departing from the spirit of the invention. The 2-inch schedule 80 pipe commonly has dimensions of 1.939-inch internal diameter, 2.375 outer diameter, 0.2180-inch thickness and a 12-inch length. It is fully contemplated pipe 101 could have most any dimensions and be most any type and make of piping structure carrying most any material for embodiments of the present invention. Pipe 101, in embodiments of the present invention, is used to show the effectiveness and usefulness of utilizing cold spray technology to patch and repair active leaks in piping structures.

Figure 11:
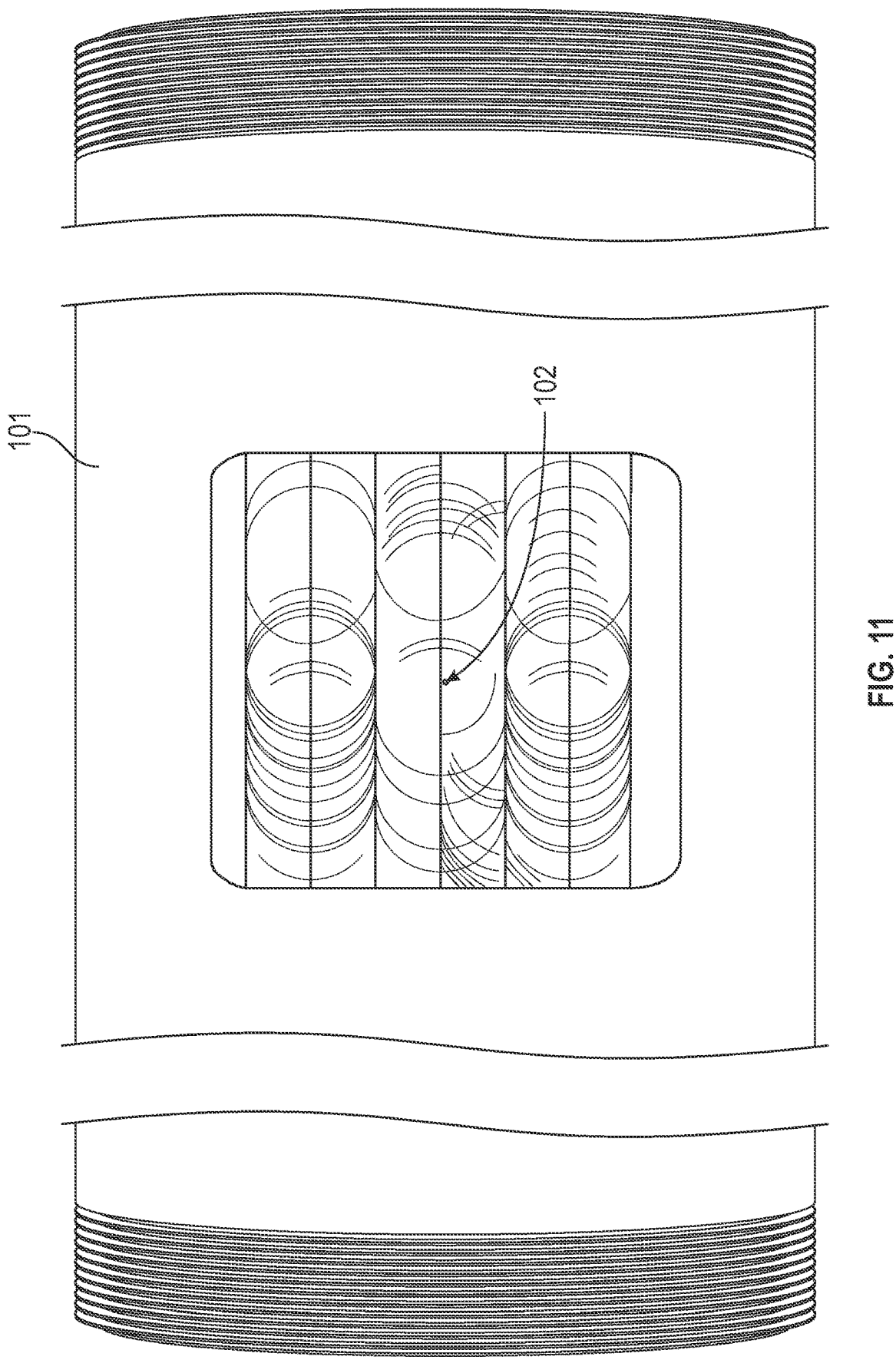
FIG. 11 is a pictorial representation of the piping structure of FIG. 10 milled down for testing in accordance with an embodiment of the present invention.

With reference to FIG. 11 a pictorial representation of the piping structure of FIG. 10 milled down for testing in accordance with an embodiment of the present invention is shown. Pipe 101 is shown as being milled down to 0.02 inch at a central location of pipe 101 for the testing. Hole 102 was drilled in pipe 101 having a diameter of 0.007 inch. The mill length is 2.5 inches.

Figure 12:
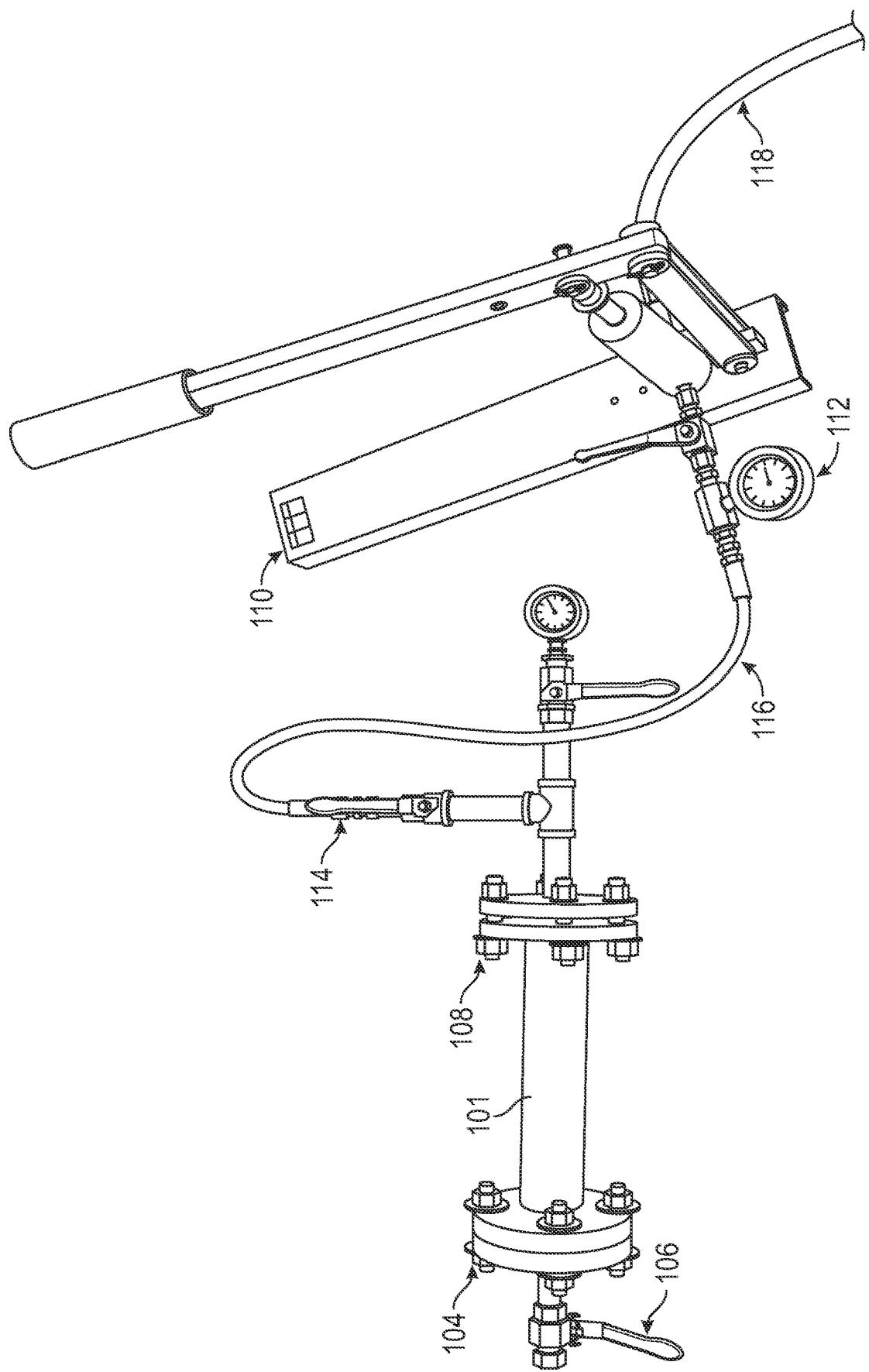
FIG. 12 is a pictorial representation of the piping structure of FIGS. 10 & 11 connected to a pressurized line for testing in accordance with an embodiment of the present invention.

With reference to FIG. 12 a pictorial representation of the piping structure of FIGS. 10 & 11 connected to a pressurized line for testing in accordance with an embodiment of the present invention is shown. Pipe 101 is shown closed at a distal end 104 by valve 106. On proximal end 108, pipe 101 is connected to a 6000-psi pump 110, Pressure gauge 112 is coupled to pump 110 and valve 114 by coupling hose 116. A water hose 118 is connected to pump 110 to provide a liquid to be pressurized. For testing purposes, pipe 101 was pressurized to 1000 psi for 10 minutes.

Figure 13:
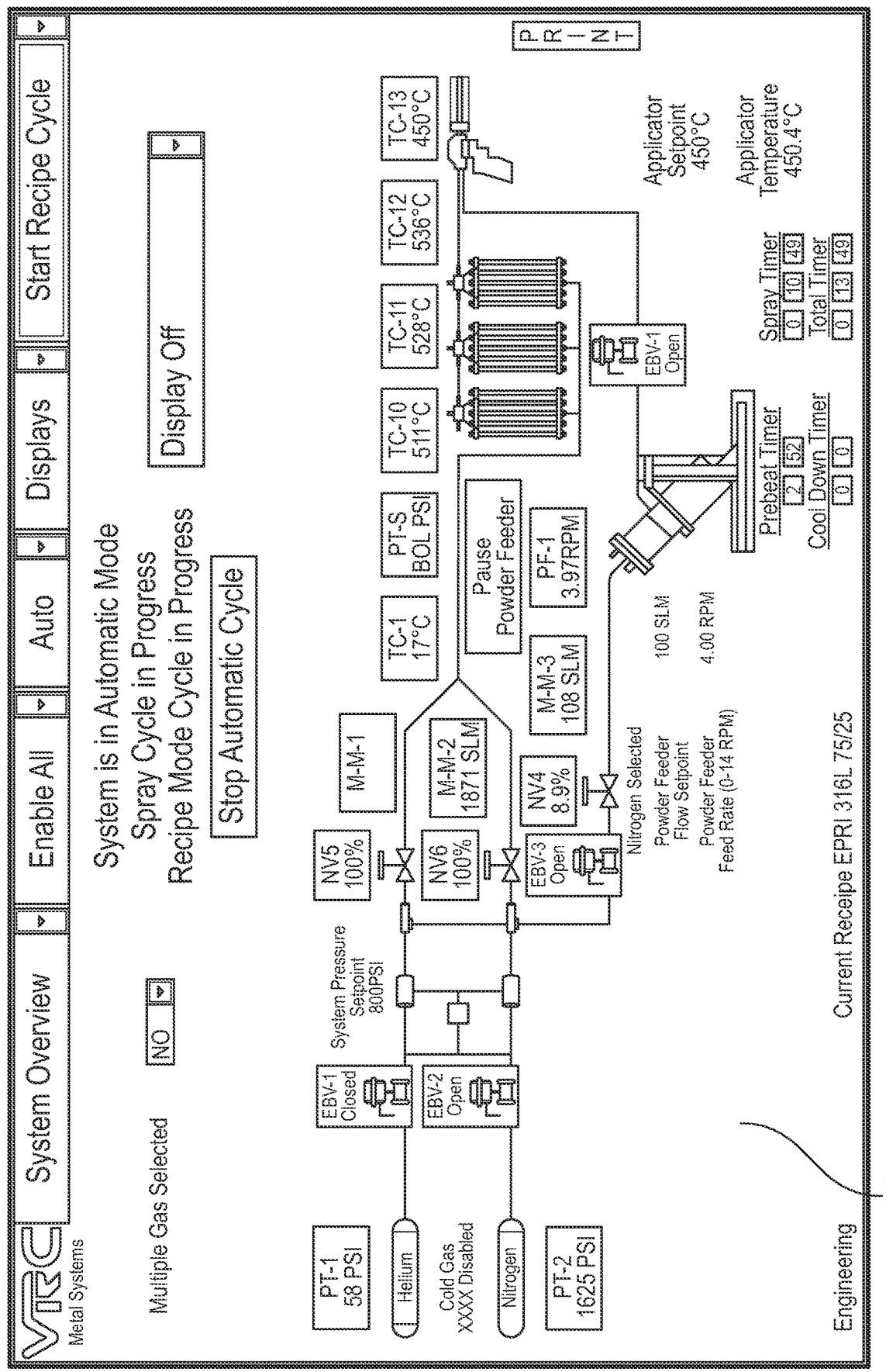
FIG. 13 is a graphical user interface for a cold spray system in accordance with an embodiment of the present invention.

With reference to FIG. 13 a graphical user interface for a cold spray system in accordance with an embodiment of the present invention is shown. Cold spray system 700 has display 710 which can display GUI (graphical user interface) 120. Utilizing GUI 120 the operators of cold spray system 700 can input the settings for usage. For example, to perform a test on cold spray application of an active pipe structure, cold spray system 700 was set at a grit blast of 80 psi, 316 L/CrC (3:1), a 489° C. spray nozzle 716 temp, 550 psi for Helium gas, a powder feed rate of 2.5 rpm and a hand spray setting.

Figure 14:
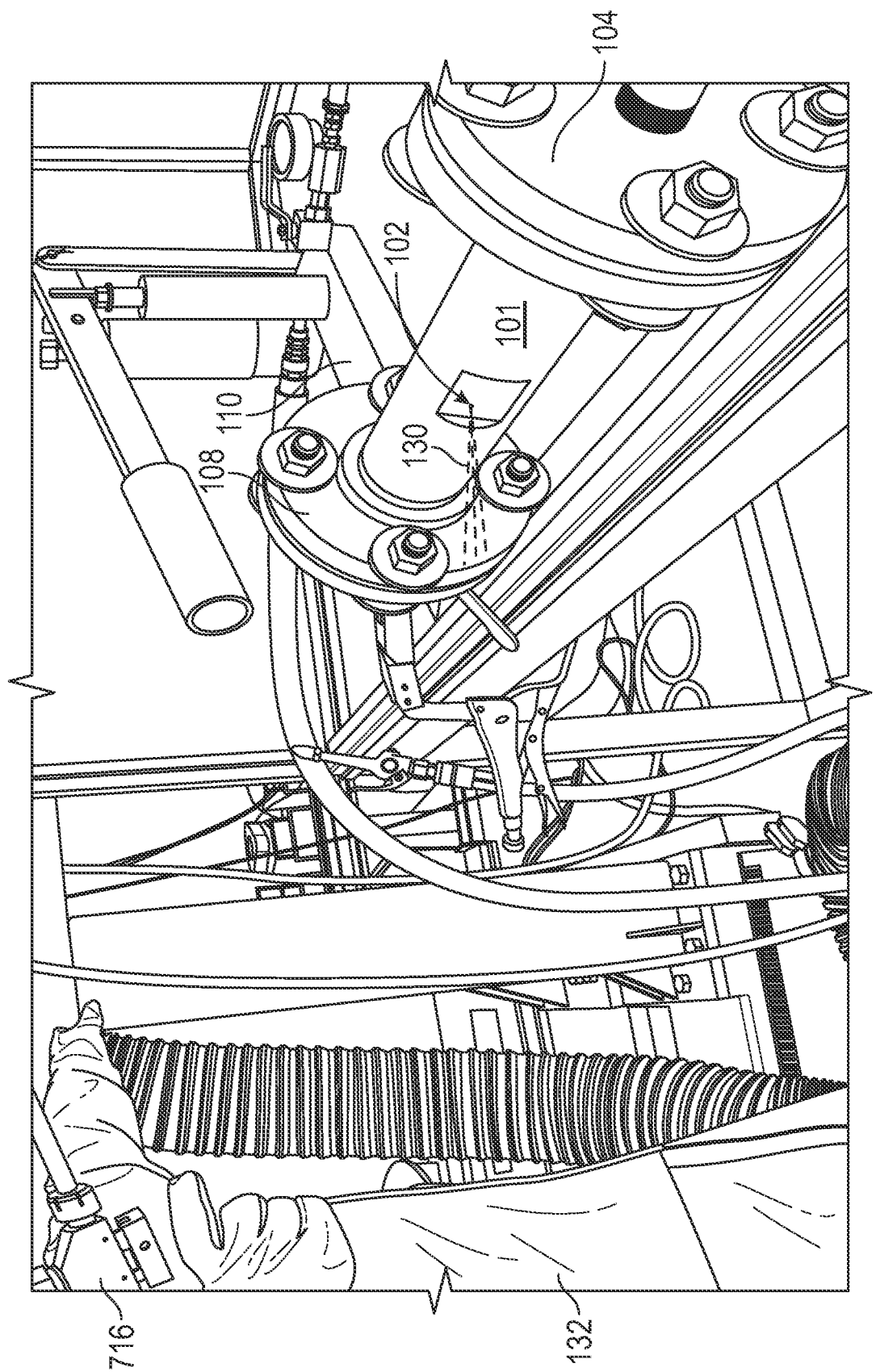
FIG. 14 is a pictorial representation of an active leak on a piping structure before cold spray repair in accordance with an embodiment of the present invention.

With reference to FIG. 14 a pictorial representation of an active leak on a piping structure before cold spray repair in accordance with an embodiment of the present invention is shown. As shown a narrow water leak 130 can be seen coming from hole 102. As mentioned above pipe 101 is pressurized to 1000 psi with water. User 132 can be seen holding spray nozzle 716 in preparation for applying the combination of pressurized gas and metal powder to hole 102 and surrounding area on pipe 101. For purposes of the present application, the use of the term metal powders can refer to powders strictly made of metal and powders having a ratio of ceramic particles (e.g., carbides, oxides, etc.), which can improve the bond strength, improve mechanical properties of the coating and minimize the sticking of the metal powders in the cold spray nozzle as well. It is further fully contemplated the "metal powder" could be a polymer for use in repairing polymer piping, such as P.V.C. (Polyvinyl Chloride) piping.

Figure 15:
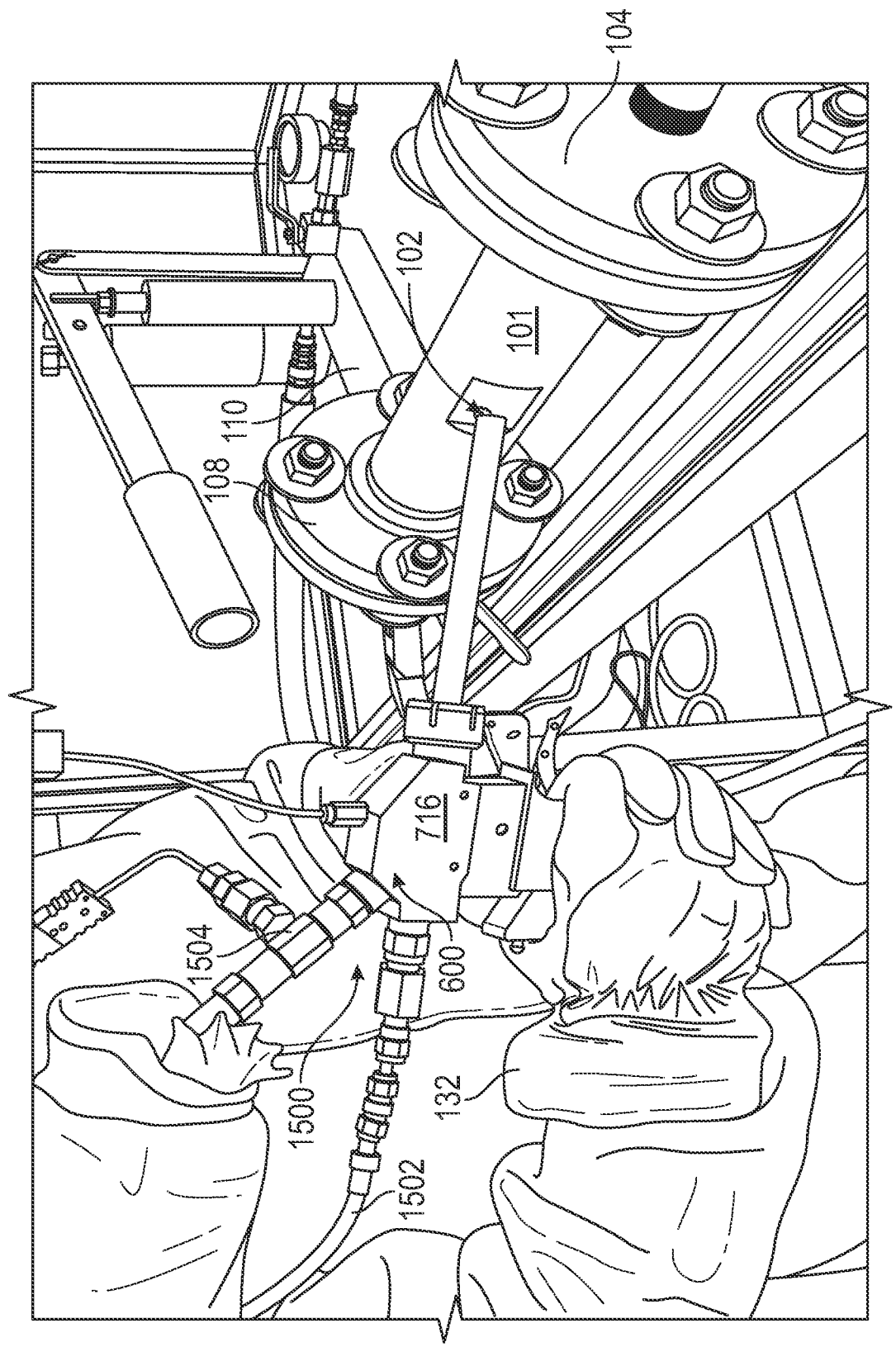
FIG. 15 is a pictorial representation of an active leak on a piping structure being cold spray repaired in accordance with an embodiment of the present invention.

With reference to FIG. 15 a pictorial representation of an active leak on a piping structure being cold spray repaired in accordance with an embodiment of the present invention is shown. As shown, user 132 has begun application of pressurized gas and metal powder from spray nozzle 716 directly to hole 102 on pipe 101. In this embodiment, the user 132 is utilizing a two-hose-to-gun system 1500, which has the mixing manifold 600 located at the spray nozzle 716. The two-hose-to-gun system 1500 does not have a heater located on the equipment portion or near the spray nozzle 716. The user 132 is shown directly applying the pressurized gas from line 1502 and metal powder from line 1504 to hole 102 where water leak 130 is coming from. While the present embodiment is discussed as a water leak for purposes of the test, it is fully contemplated most any material could be within the pipe without departing from the spirit of the invention. During application of the pressurized gas and metal powder, the user 132 will rotate spray nozzle 716 to hit hole 102 from as many angles as he can to begin creating a metal barrier across hole 102. By placing the spray nozzle 716 directly into hole 102 and water leak 130, the metal powder can begin bonding, as described above, as the pressurized gas has heated the metal powder. When the metal powder bonds it begins sealing the hole 102, even when there is an active leak.

Figure 16:
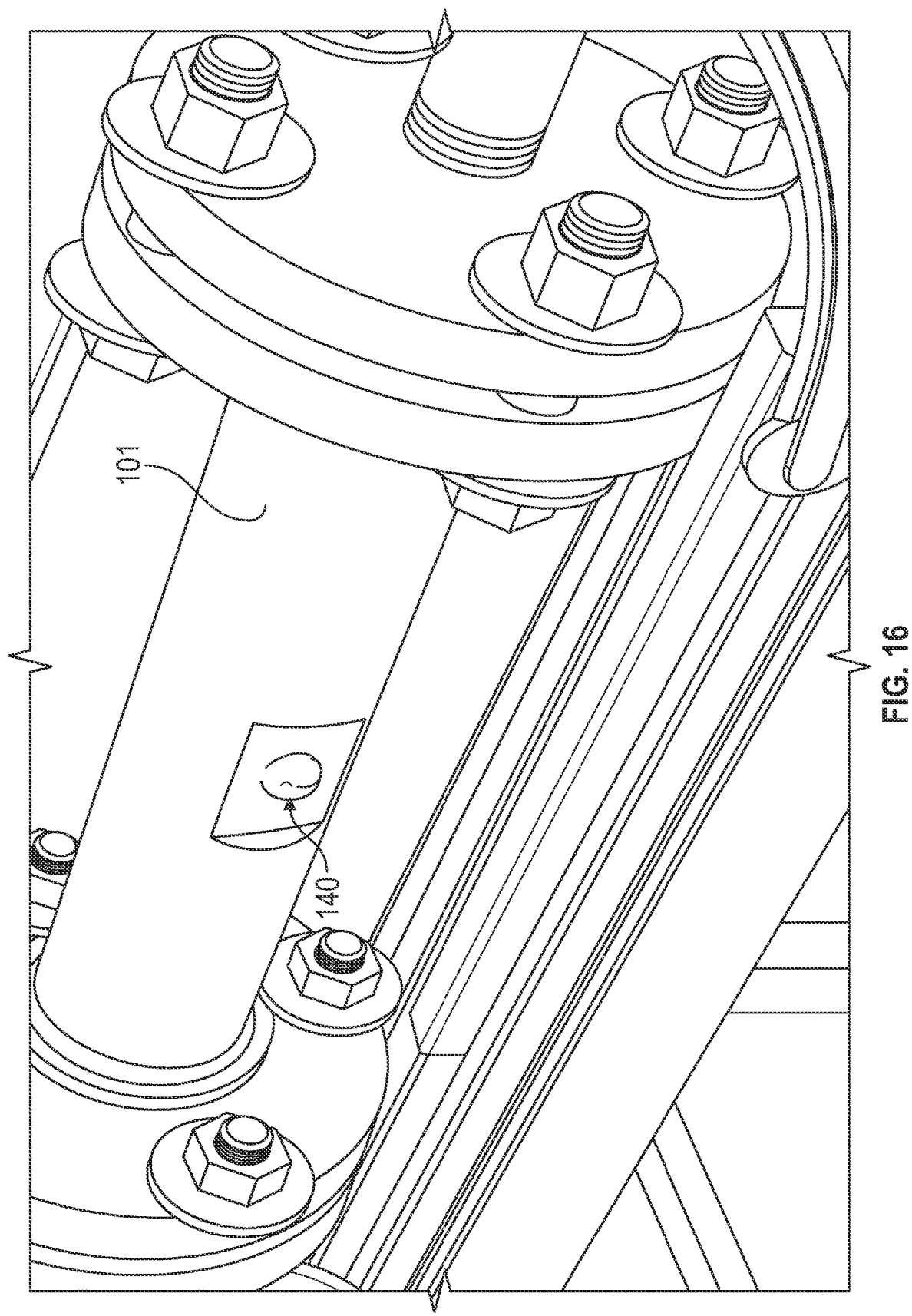
FIG. 16 is a pictorial representation of a sealed leak on a piping structure after being cold spray repaired in accordance with an embodiment of the present invention.

With reference to FIG. 16 a pictorial representation of a sealed leak on a piping structure after being cold spray repaired in accordance with an embodiment of the present invention is shown. As shown, pipe 101 now has a "volcano" or mound 140 of metal which has built up and covered hole 102 and sealed leak 130. The metal powder will build up around hole 102 which had pressure pushing outward, thus the metal powder will build up in a "volcano" or mound 140 fashion. The inventors performed an adhesion test on the mound 140. A posiTest AT-A Automatic Adhesion Tester was used to test the seal of hole 102. The adhesion tester measured 4476 psi, stating the mound 140 would hold up to 4,476 psi within pipe 101. This shows mound 140 would be a satisfactory patch for pipe 101 as pipe 101 was not more than 1,000 psi pressurized.

Figure 17:
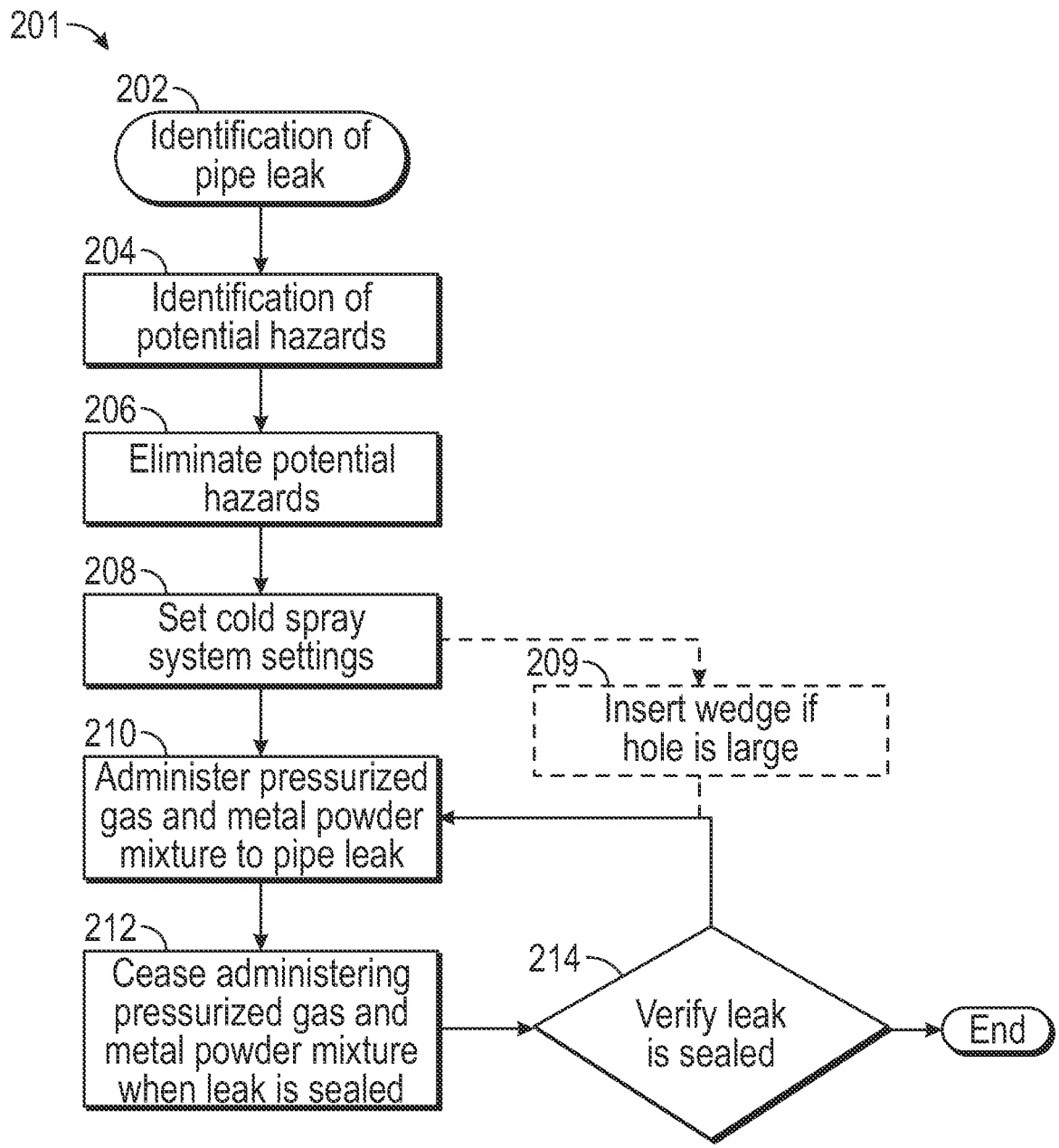
FIG. 17 is a flowchart diagram of a method for sealing a leak on an active leaking pipe in accordance with an embodiment of the present invention.

With reference to FIG. 17 a flowchart diagram of a method for sealing a leak on an active leaking pipe in accordance with an embodiment of the present invention is shown. Active leak sealing system 200 can be shown starting at state 202 where an active leak can be identified. Then at state 204 user 132 could take a moment to assess if there were any potential hazards which would make active leak sealing difficult and/or hazardous. Examples would include, slip hazards or puddles of material on the floor, hazardous materials, flammable materials, etc. User 132 could then tale actions to secure the area to ensure active leak sealing could take place, such as cleaning up the puddling which had occurred or airing out the room of the active leak.

At state 208, user 132 could set the cold spray system settings on display 710/GUI 120. At state 210 user 132 could administer the pressurized gas and metal powder mixture to the active leak as discussed above and then cease administration of the mixture when leak 130 is sealed at state 212. The user 132 could then verify the leak is sealed at state 214 and administer more mixture if necessary or put the equipment and cold spray system 700 away.

Figure 18:
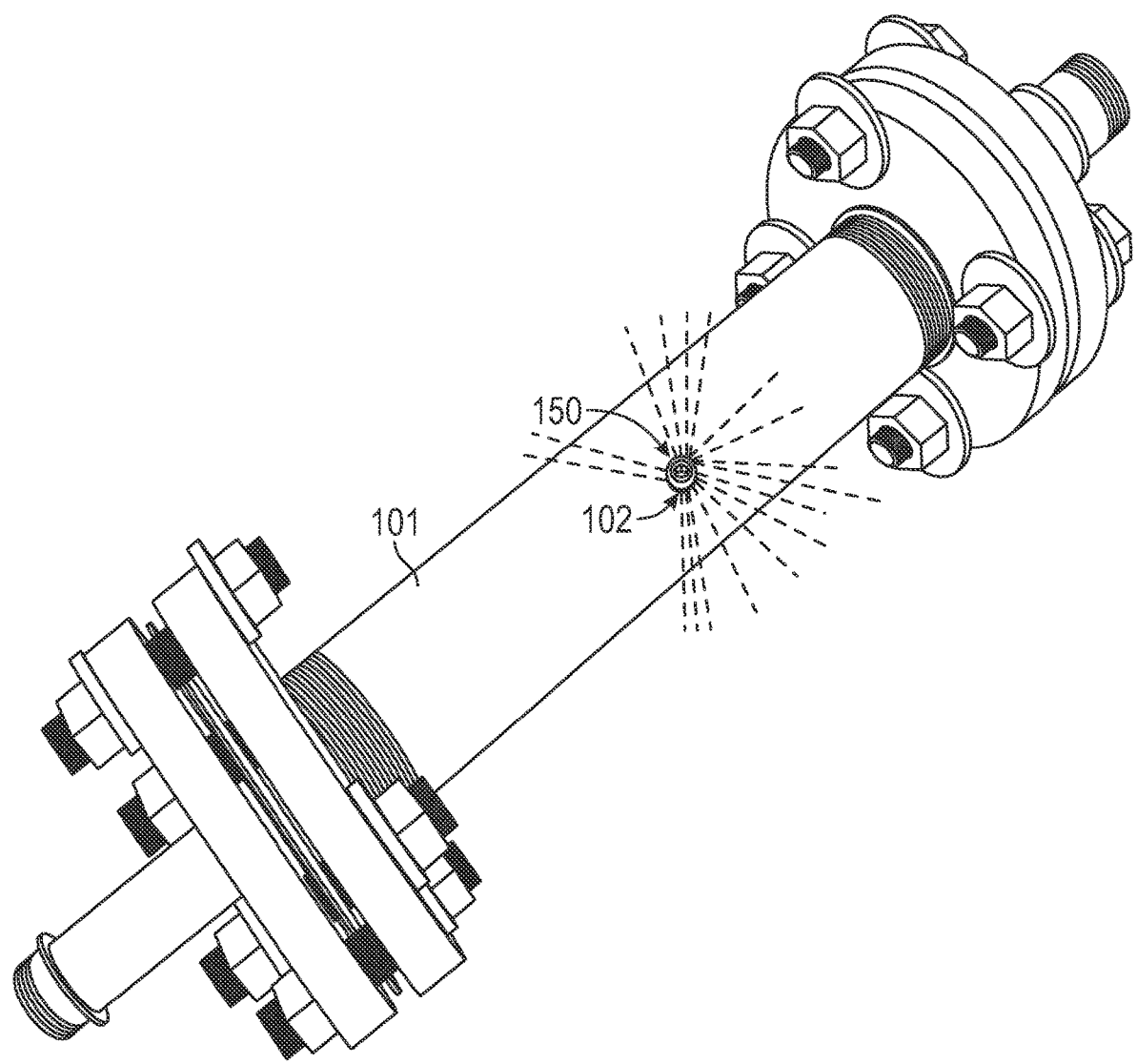
FIG. 18 is a pictorial representation of an active leak with a wedge on an active leaking pipe in accordance with an embodiment of the present invention.

With reference to FIG. 18 a pictorial representation of an active leak with a wedge on an active leaking pipe in accordance with an embodiment of the present invention is shown. As shown, in events where a large hole has opened in a pipe 101 a wedge 150 cold be used to fill a substantial portion of the hole 102. Wedge 150 reduces the amount of time it would take to patch over hole 102 by significantly reducing the surface area of the leak 130 and amount material shooting out of hold hole 102. Wedge 150 could take the form of a screw or an anchor and would simply be screwed into the hole 102 and or placed in hole 102 and anchored at state 209.

The invention is not to be limited to the embodiments described herein. The invention contemplates numerous variations in the embodiments shown above. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

What is claimed is:

1. A method of repairing an active leak, comprising the steps of:
    identifying the active leak on a pipe structure, tank or pressure vessel;
    setting cold spray system settings to repair the pipe structure;
    administering pressurized gas and metal powder to an active pipe leak;
    creating a seal with the metal powder at the active pipe leak for repairing the active leak.

2. The method of claim 1, further comprising the step of identifying any potential hazards surrounding the active pipe leak.

3. The method of claim 2, further comprising the step of eliminating and/or reducing the potential hazards surround the active pipe leak.

4. The method of claim 1, further comprising the step of inserting a wedge within an active leak pipe hole.

5. The method of claim 1, further comprising the step of ceasing administration of pressurized gas and metal powder to the active pipe leak when it appears sealed.

6. The method of claim 1, further comprising the step of verifying the active pipe leak is sealed.

7. The method of claim 1, further comprising re-administering the pressurized gas and the metal powder to the active leak if the active leak is not fully sealed.

8. A cold spray repair for active leaks in pipe, comprising:
    taking a gas and a powder;
    combining the gas and the powder creating a gas-powder mixture;
    communicating the gas-powder mixture to a spray gun; and
    administering the gas-powder mixture from the spray gun onto a surface of the pipe in a location of a hole;
    creating a seal at the location of the hole with the powder from the gas-powder mixture for repairing active leaks;
    pressure testing the seal for verifying the hole is sealed.

9. The method of claim 8, further comprising the step of repairing the piping while the piping still has contents flowing through it.

10. The method of claim 8, further comprising the step of setting a cold spray system setting.

11. The method of claim 8, further comprising the step of verifying the active leak has been sealed.

12. The method of claim 8, further comprising the step of inserting a wedge into the hole if the hole is large.

13. The method of claim 8, further comprising the step of identifying potential hazards at the active leak.

14. The method of claim 13, further comprising the step of eliminating and/or reducing the potential hazards at the active leak.

15. A method for sealing a leak in a pressurized pipe, comprising:
    placing a nozzle of the cold sprayer system directly into a leak in the pressurized pipe;
    spraying pressurized powder at the leak in the pressurized pipe for sealing the leak;
    bonding the pressurized powder with the pressurized pipe to seal the leak;
    performing an adhesion test on a seal of the leak to verify the leak is sealed, wherein the adhesion test determines an amount of pressure the seal can withstand.

16. The method of claim 15, further comprising the step of spraying the pressurized powder with a heated gas, wherein the heated gas allows the pressurized powder to bond with the pressurized pipe.

17. The method of claim 15, further comprising the step of colliding the pressurized powder with the pressurized pipe for closing the leak.

18. The method of claim 15, further comprising the step of closing the leak with the pressurized powder.

19. The method of claim 15, further comprising the step of closing the leak with a wedge and the pressurized powder.

* * * * *